US006186470B1

(12) United States Patent
Officier

(10) Patent No.: US 6,186,470 B1
(45) Date of Patent: Feb. 13, 2001

(54) FILLING VALVE

(75) Inventor: Arthur Everardus Officier, Bunnik (NL)

(73) Assignee: Stork Bottling Systems B.V., Raamsdonksveer (NL)

( * ) Notice: Under 35 U.S.C. 154(b), the term of this patent shall be extended for 0 days.

(21) Appl. No.: 09/237,192

(22) Filed: Jan. 26, 1999

(30) Foreign Application Priority Data

Jan. 27, 1998 (NL) .................................................. 1008131

(51) Int. Cl.[7] .................................................. F16K 47/04
(52) U.S. Cl. .......................... 251/122; 251/205; 251/356
(58) Field of Search .................................. 251/121, 122, 251/124, 205, 356

(56) References Cited

U.S. PATENT DOCUMENTS

| | | | | |
|---|---|---|---|---|
| 654,891 | * | 7/1900 | Haley | 251/122 X |
| 854,641 | * | 5/1907 | Haley | 251/122 X |
| 2,035,202 | * | 3/1936 | Smith | 251/122 X |
| 3,317,184 | * | 5/1967 | Usry | 251/122 X |
| 4,565,210 | * | 1/1986 | Heine et al. | 251/122 X |
| 4,688,755 | * | 8/1987 | Pluviose | 251/121 |
| 4,707,278 | * | 11/1987 | Breyer et al. | 251/122 |
| 5,368,273 | * | 11/1994 | Dante | 251/122 |
| 5,464,039 | * | 11/1995 | Bergamini | 251/123 X |

FOREIGN PATENT DOCUMENTS

| | | | | |
|---|---|---|---|---|
| 1201013 | * | 9/1965 | (DE) | 251/122 |
| 3233445 | * | 3/1984 | (DE) | 251/122 |
| 0 480 346 | | 4/1992 | (EP) . | |
| 0 559 513 | | 9/1993 | (EP) . | |
| 0138571 | * | 10/1981 | (JP) | 251/122 |

* cited by examiner

*Primary Examiner*—John Rivell
(74) *Attorney, Agent, or Firm*—Stroock & Stroock & Lavan LLP

(57) ABSTRACT

Filling valve for dispensing metered quantities of a flow of medium, comprising:

- a valve housing with a flow passage which has an inlet and an outlet opening;
- an actuable valve body which is accommodated in the flow passage, for opening and closing the outlet opening;
- actuating means for moving the valve body to and fro between an open position and a closed position;

in which the valve body comprises a transitional part having a substantially circular cross section, which transitional part transits into a pointed end part, the transitional part and the pointed end part merging smoothly into one another via a convexly curved part running into an adjoining concavely curved part.

11 Claims, 3 Drawing Sheets

FILLING VALVE

FIELD OF THE INVENTION

The invention relates to a filling valve for dispensing metered quantities of a flow of medium, comprising:

a valve housing with a flow passage which has an inlet and an outlet opening;

an actuable valve body which is accommodated in the flow passage, for opening and closing the outlet opening;

actuating means for moving the valve body to and fro between an open position and a closed position.

BACKGROUND OF THE INVENTION

A filling valve of this nature is known from EP-A-0,480,346. This document shows a valve body which substantially comprises a rod which, at its end, merges into a drop-shaped head. The rod is provided with guide fins. The guide fins centre the valve body and furthermore serve to convert any turbulence in a flow of medium supplied into a laminar flow. To this end, the guide fins are of elongate design.

A drawback of this known filling valve is that the known filling valve has a relatively long travel between opening and closure. This reduces the filling accuracy, in particular as a result of the portion of additional medium which is forced out of the flow passage by the valve body during a closure movement. Furthermore, in order to ensure a laminar flow of medium the guide fins have to have a specific minimum length and large numbers of these fins have to be arranged around the rod. The guide fins have to meet high demands on accuracy, which makes them difficult to manufacture and therefore expensive. Moreover, the guide fins are fragile. Although the laminar flow of medium leaving the outlet opening of the filling valve is stable and unidirectional, it results in a relatively high impact force of the medium at a bottom of a container to be filled, which may lead to for example the forming of foam.

SUMMARY OF THE INVENTION

The object of the invention is to eliminate the abovementioned drawbacks, and provide a filling valve having a relatively short travel between opening and closure, while a stable, unidirectional flow pattern with a substantially flat velocity profile (so called "plug flow") of the medium leaving the filling valve in the open position is ensured, resulting in a minimum impact force of the medium at a bottom of a container to be filled.

This object is achieved according to the invention by means of a filling valve according to claim 1. In this case, the valve body comprises a transitional part having a substantially circular cross-section and a pointed end part. The transition between the transitional part and the end part is smooth, and ensures that this transition does not generate further turbulence in the flow of medium. The downstream pointed end part ensures that the flow of medium leaves the filling valve as a stable, parallel, unidirectional flow with a substantially flat velocity profile ("plug flow"). The streamlined transition between the transitional part and the end part runs via a convexly curved part of the valve body and an adjoining concavely curved part of the valve body and transits into the pointed end part. Owing to this particular shape of the transition, in combination with the pointed end part, only a short travel of the valve body is required in order to open and close the filling valve. The short travel keeps the drop low and therefore increases the filling accuracy. The specific design of the filling valve, and in particular the convexly/concavely curved parts thereof, results in a stable unidirectional flow pattern with a substantially flat velocity profile of the medium leaving the filling valve. The flat velocity profile advantageously provides a minimum impact force of the medium at a bottom of a container to be filled, resulting in a minimum formation of foam and thus in short filling times.

In particular the transitional part of the valve body is a cylindrical part. The cylindrical transitional part of the valve body has the role of converting any turbulence in a flow of medium which enters the valve into a unidirectional flow.

More in particular, the wall of the flow passage, at least near the outlet opening thereof, is substantially of the same shape as the outer wall of the corresponding end part of the valve body. The flow passage in the valve housing also has a transitional part which merges into a curved outlet opening which is situated downstream. The fact that the head of the valve body becomes continuously narrower, together with the opposite curved wall parts of the outlet opening, ensures that it is possible to achieve a continuous flow acceleration of the flow of medium in the flow passage in the open position of the filling valve while retaining a stable, unidirectional flow profile. The flow acceleration reaches a maximum at the outlet opening in order to achieve a stable substantially flat velocity profile.

Preferred embodiments of the invention are defined in the subclaims.

BRIEF DESCRIPTION OF THE DRAWINGS

The invention will be explained in more detail with reference to the appended drawing, in which.

DESCRIPTION OF THE PREFERRED EMBODIMENT

Figure 2:
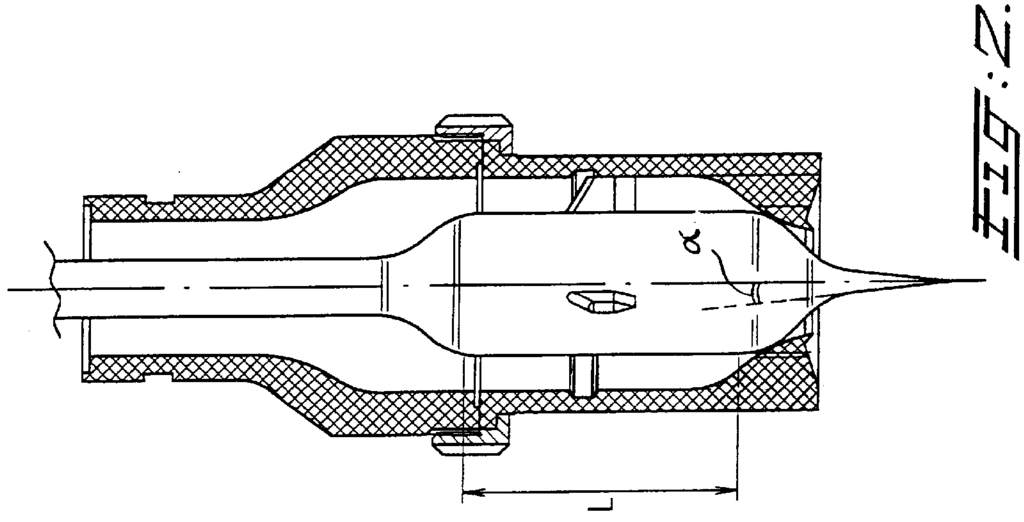
FIG. 2 shows a view in accordance with FIG. 1, with the filling valve in the closed position.
Figure 1:
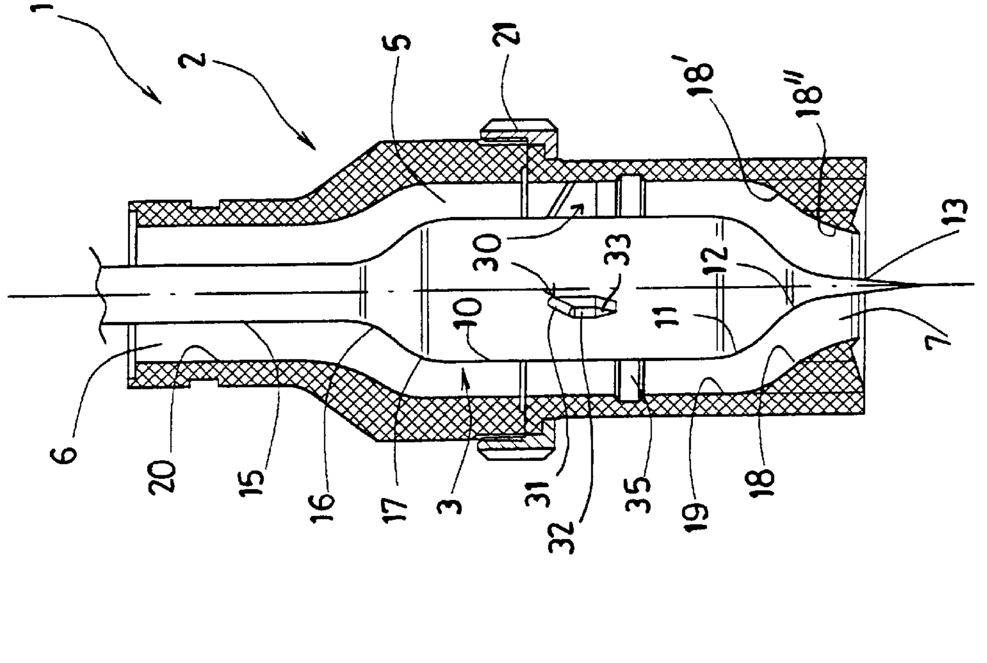
FIG. 1 shows a cross section through a filling valve according to the invention in an open position.

FIG. 1 shows a filling valve 1 comprising a valve housing 2 and a valve body 3. The valve housing 2 is shown in cross section, while a perspective view of the valve body 3 is shown. The filling valve 1 is intended to dispense metered quantities of a flow of medium, in particular liquid foodstuffs. The valve housing 2 comprises a flow passage 5 with an inlet: and an outlet opening 6 and 7, respectively. The valve body 3 is accommodated in the flow passage 5 and serves to open or close the outlet opening 7. The valve body 3 has a cylindrical transitional part 10 which merges smoothly into a pointed end part 13 via a convexly curved part 11 and an adjoining concavely curved part 12. Upstream of the cylindrical transitional part 10, the valve body 3 has a rod-shaped beginning part 15. The transition between the rod-shaped beginning part 15 and the cylindrical transitional part 10 runs smoothly from a concavely curved part 16 to a convexly curved part 17. The rod-shaped beginning part 15 forms part of actuating means of the valve body 3, with which the valve body 3 can be moved to and fro in the longitudinal direction with respect to the valve housing 2 between an open position and a closed position (FIGS. 1 and 2, respectively). In the region of the valve body 3, the wall of the flow passage 5 is substantially of the same shape as the outer wall of the valve body 3. The wall comprises a curved wall part 18 in the vicinity of the outlet opening 7, a cylindrical transitional wall part 19 situated upstream of the latter, and a cylindrical wall part 20 situated still further upstream, this wall part 20 having a smaller cross section than the cylindrical transitional wall part 19. The curved wall part 18 consists of a concavely curved wall part 18' which runs downstream into an adjoining convexly curved wall part 18". In order to be able to arrange the valve body 3 in the valve housing 2, the valve housing 2 is composed of two parts which are joined together by means of a screw connection 21.

In the open position of the filling valve 1, as shown in FIG. 1, a passage gap is left clear between the valve body 3 and the wall of the flow passage 5 over the entire length of the valve body 3. In this open position, a flow of medium which is supplied to the inlet opening 6 can flow around the valve body 3 and leave the flow passage 5 again at the outlet opening 7.

The cylindrical transitional part 10 of the valve body 3 and the cylindrical transitional wall part 19 of the flow passage 5 function as a transformation section in which any turbulence in a flow of medium which enters the valve is converted into a stable unidirectional flow. In order to be able to ensure a completely unidirectional flow at the outlet, it has been found that the length L of the cylindrical transitional part 10 of the valve body 3 is preferably at least equal to 6 mm.

As can be seen in FIG. 1, the gap width in the open position is substantially constant along the entire longitudinal section of the filling valve 1. The transition from the cylindrical transitional part 10 to the narrow pointed end part 13 means that the flow area reduces in the downwards direction. As a result, a flow of medium in the flow passage 5 will be continuously accelerated in the downwards direction. This is advantageous because an accelerating flow has a stabilizing action on the flow of medium and enhances the creation of a flat velocity profile of the medium.

The special shape of the head of the valve body 3, together with the curved wall parts 18 of the outlet opening 7 of the flow passage 5, ensures that a short travel of the valve body 3 is sufficient to open and close the filling valve 1. This is advantageous in particular because a short travel increases the filling accuracy. In this case, the outlet opening 7 is closed by pressing the convexly curved part 11 of the valve body 3 and the convexly curved wall part 18" of the flow passage 5 onto one another (cf. FIG. 2).

The pointed end part 13 of the valve body 3 has an acute vertex angle which is less than 25°, in particular less than 10°. In the embodiment shown the acute vertex angle $\alpha$ is approximately 6°. The slender point ensures that the flow of medium flows along the wall surface of the pointed end part 13 for a certain time and is gradually forced into the desired delivery direction. Furthermore, it ensures that the flow of medium can flow off the pointed end part 13 via a streamlined shape without turbulence arising at the end of the pointed part 13.

In order to centre the valve body 3 in the flow passage 5, three guide fins 30 are arranged on the cylindrical transitional part 10 of the valve body 3. In order to minimize interference to the flow, the guide fins 30 are designed in the form of vains, i.e. each guide fin 30 comprises a bevelled front part 31, a planar central part 32 and a rounded, downstream end part 33. Since the guide fins according to the invention merely serve to centre the valve body, they may advantageously be of very compact design.

If, by way of example, fruit juices containing pulp, such as fruit flesh, are used as the flow of medium, there is a risk of the pulp adhering to the top of the bevelled front part 31 of the guide fins 30. In order to remove this pulp automatically, a circumferential discharge groove, in the form of an annular recess 35, is provided in the cylindrical wall part 19 of the flow passage 5. In this case, the width of the planar part 32 of the guide fins 30 is greater than the width of the annular recess 35. In the closed position of the filling valve 1 (FIG. 2), the end of the bevelled part 31 of the guide fins 30 lies between the bottom and top edges of the annular recess 35. Any pulp can slide off the bevelled part 31 of the guide fins 30 and pass into the annular recess 35. At the same time, the downstream part of the planar part 32 of the guide fins 30 bears against the cylindrical wall part 19 of the flow passage 5, thus ensuring that centring is maintained. In the open position of the filling valve 1 (FIG. 1), the entire guide fin 30 lies just above the top edge of the annular recess 35, with the result that the entire planar part 32 of the guide fin 30 bears against the cylindrical wall part 19 of the flow passage 5. As a result, any pulp which has accumulated in the annular recess 35 comes free downstream of the guide fins 30 and can be entrained by the flow of medium. Any pulp which continues to adhere to the top of the bevelled part 31 of the guide fins 30 is cut off during an opening movement at the moment at which this part of the guide fin 30 slides past the top edge of the annular recess 35. The embodiment according to the invention with the very compact guide fins in combination with the circumferential discharge groove ensures correct flow through the filling valve without any pulp being able to continue to adhere behind the guide fins for prolonged periods of time. Another advantage of the compact guide fins in combination with the annular recess is that a clearance is created for cleaning purposes. If a cleaning medium flows through the filling valve, also the fin tips are cleaned by this cleaning medium.

Figure 3:
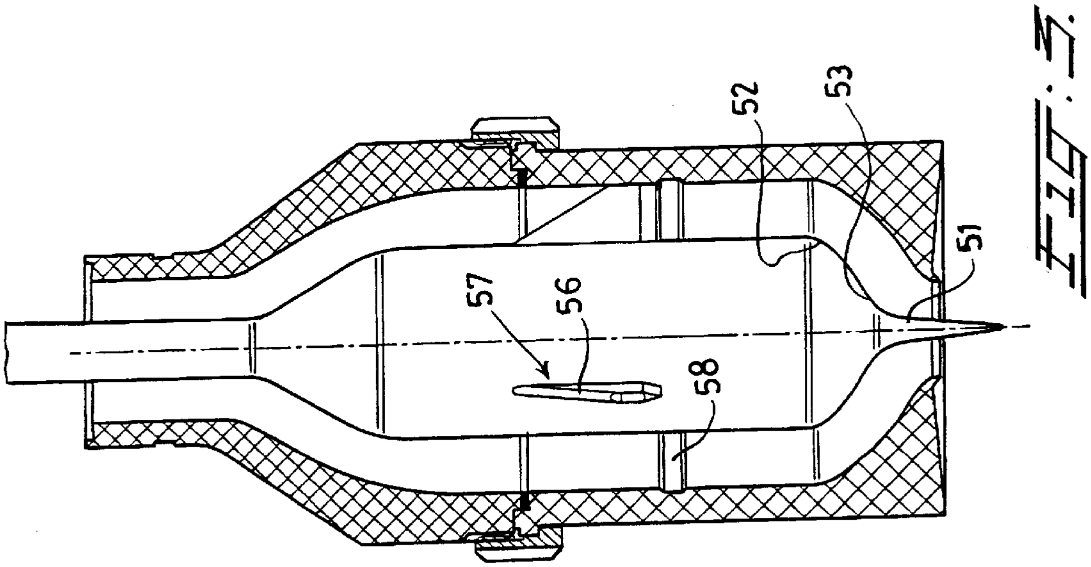
FIG. 3 shows a view in accordance with FIG. 1 of a second embodiment.
Figure 4:
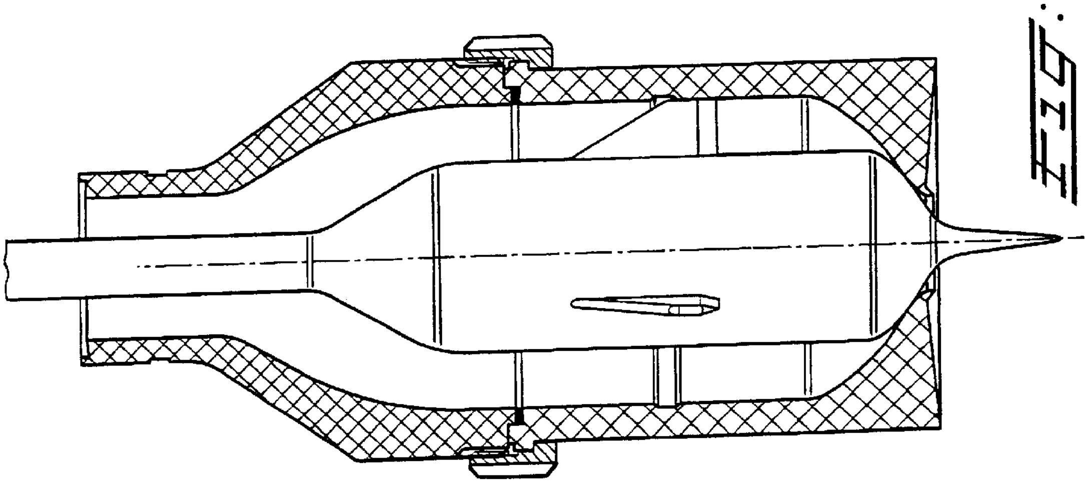
FIG. 4 shows a view in accordance with FIG. 2 of the second embodiment.

The embodiment of the filling valve in FIGS. 3 and 4 is largely similar to the one shown in FIGS. 1 and 2, the most important difference being a slightly less sharp top angle of the pointed end part 51 in combination with different degrees of curvature of the convexly and concavely curved parts 52 and 53, respectively. These differences together provide the valve body with a somewhat flattened front part, resulting in an advantageous shorter travel between opening and closure with respect to the embodiment shown in FIGS. 1 and 2, while the other benefits of the invention, like the ensurance of the unidirectional flow, are maintained.

Another difference of the embodiment shown in FIGS. 3 and 4 is that the bevelled front parts 56 of the guide fins 57 are constructed longer with respect to the ones shown in FIGS. 1 and 2. The result of this being that pulp particles colliding with these bevelled front parts 56, have a tendency to more easily slide in the direction of the discharge groove 58, thus contributing to a quicker discharge of these pulp particles.

Figure 6:
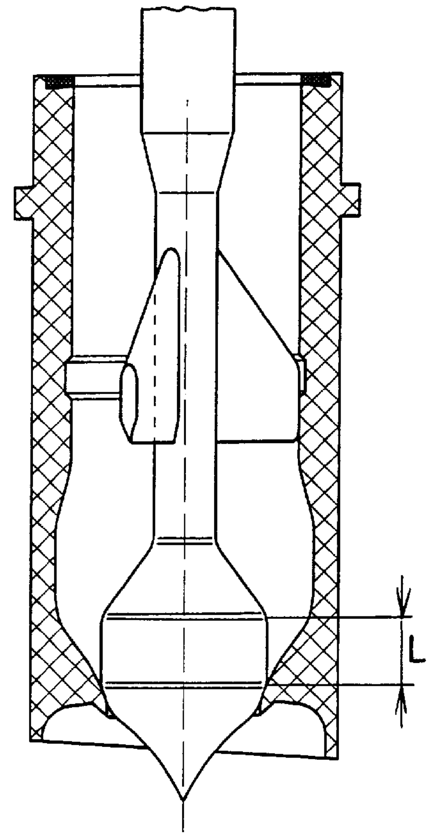
FIG. 6 shows a view in accordance with FIG. 2 of the third embodiment.
Figure 5:
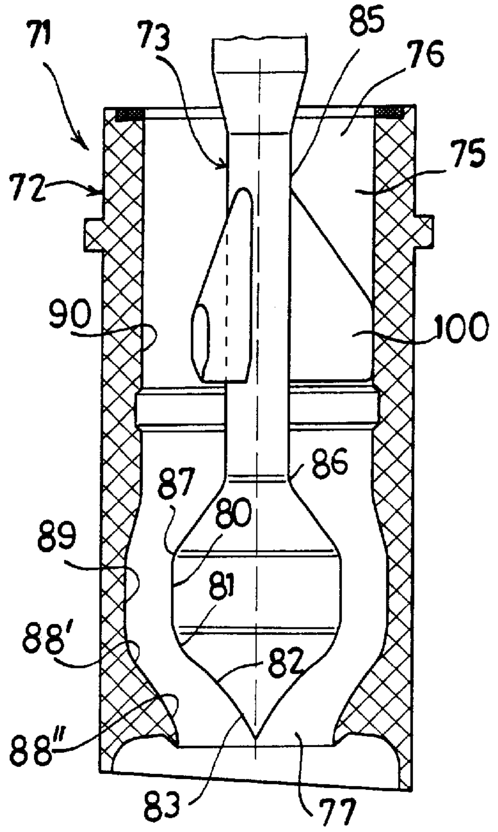
FIG. 5 shows a view in accordance with FIG. 1 of a third embodiment.

FIGS. 5 and 6 show a filling valve 71 comprising a valve housing 72 and a valve body 73. The valve housing 72 comprises a flow passage 75 with an inlet and an outlet opening 76 and 77, respectively. According to the invention the valve body 73 has a cylindrical transitional part 80 which merges smoothly into a pointed end part 83 via a convexly curved part 81 and an adjoining concavely curved part 82.

Upstream of the cylindrical transitional part 80, the valve body 73 has a rod-shaped beginning part 85. The cylindrical transitional part 80 runs smoothly from a concavely curved part 86 to a convexly curved part 87. The wall of the flow passage 75 comprises a cylindrical wall part 90, a cylindrical transitional wall part 89, a concavely curved wall part 88' and a convexly curved wall part 88" opening out into the outlet opening 77.

The special shape of the head of the valve body 73 together with the curved wall parts 88 near the outlet opening 77 of the flow passage 75, provides an advantageous short travel of the valve body 73 between the open and closed position, while at the same time ensuring that the flow of medium can flow off the pointed end part 83 via a streamlined shape without turbulence arising at the end of the pointed part 83.

The length L of the cylindrical transitional part 80 of the valve body 73 is preferably at least equal to 6 mm. As can be seen in FIG. 5 the gap width in the open position is larger at the location of the rod-shaped beginning part 85 than at the location of the cylindrical transitional part 80. Thus it is possible to arrange the entire valve body 73 in the valve housing 72 via the inlet opening 76. Therefore the valve housing 72 may be composed of one part. It has been found in practice that this special shape of the valve body 73 with the combination of the relatively small cylindrical transitional part 80 and the relatively long rod-shaped beginning part 85, also gives good results with respect to transforming any turbulence in a flow of medium which enters the valve into a unidirectional flow at the outlet.

This embodiment of the valve body also comprises guide fins 100. The guide fins 100 are provided on the rod-shaped beginning part 85. Since the guide fins 100 are merely provided for centring the valve body 73 in the flow passage 75, they are of compact design, thus minimizing interference with the flow of medium.

The special shape of the valve body according to the invention provides a filling valve which in an open position delivers a very stable, unidirectional flow of medium, with a flat velocity profile, while the travel required to open and close the filling valve is advantageously short. Moreover, the valve body and the valve housing are of simple design and are inexpensive to produce. Owing to the compact form of the guide fins and the circumferential discharge groove which is arranged in the valve housing, the filling valve is eminently suitable for use in a filling device which is intended to fill packaging units with liquids which contain pulp, for example fruit juices which contain fruit flesh. Also complete cleaning of the fin tips will be ensured by the addition of the discharge groove.

What is claimed is:

1. Filling valve for dispensing metered quantities of a unidirectional flow of medium having a flat velocity profile, comprising:

a valve housing with a flow passage which has an inlet and an outlet opening;

an actuable valve body which is accommodated in the flow passage, for opening and closing the outlet opening;

actuating means for moving the valve body to and fro between an open position and a closed position, wherein said valve body comprises a transitional part having a substantially circular cross section, which transitional part transits into a pointed end part, said transitional part and said pointed end part merging smoothly into one another via a convexly curved part running into an adjoining concavely curved part, wherein said transitional part is substantially cylindrical, and said transitional part has a length L of at least 6 mm.

2. Filling valve according to claim 1, in which the wall of the flow passage, at least near the outlet opening thereof, is substantially of the same shape as the outer wall of the corresponding end part of the valve body, and comprises a substantially cylindrical transitional wall part having a length greater than 6 mm, which transitional wall part opens out into the outlet opening, the outlet opening having a smaller diameter than the transitional wall part, the transitional wall part and the outlet opening merging smoothly into one another via concavely curved wall part running into an adjoining convexly curved wall part.

3. Filling valve according to claim 1, in which the pointed end part of the valve body has an acute vertex angle, in particular of less than 25°.

4. Filling valve according to claim 1, in which the valve body furthermore has a rod-shaped beginning part, the rod-shaped beginning part and the transitional part merging smoothly into one another via a concavely curved part running into a convexly curved part.

5. Filling valve according to claim 1, in which the valve body is provided with guide fins.

6. Filling valve according to claim 5, in which the guide fins are provided on the cylindrical transitional part.

7. Filling valve according to claim 5, in which the flow passage is provided, in the vicinity of the guide fins, with a circumferential discharge groove.

8. Filling valve according to claim 5, in which the valve body furthermore has a rod-shaped beginning part, the rod-shaped beginning part and the transitional part merging smoothly into one another via a concavely curved part running into a convexly curved part.

9. Filling valve according to claim 8, in which the guide fins are provided on the rod-shaped beginning part.

10. Filling valve according to claim 1, in which portions of said flow passage between said transitional part and said valve housing define a gap having a substantially constant gap width with said valve body being in an open position.

11. Filling valve for dispensing metered quantities of a flow of medium, comprising:

a valve housing with a flow passage which has an inlet and an outlet opening;

an actuable valve body which is accommodated in the flow passage, for opening and closing the outlet opening;

actuating means for moving the valve body to and fro between an open position and a closed position, wherein said valve body comprises a transitional part having a substantially circular cross section, which transitional part transits into a pointed end part, said transitional part and said pointed end part merging smoothly into one another via a convexly curved part running into an adjoining concavely curved part, wherein said valve body is provided with guide fins, and wherein, a circumferential discharge groove is provided in said flow passage in the vicinity of said guide fins.

* * * * *